United States Patent
Glasgow et al.

(10) Patent No.: US 10,298,560 B2
(45) Date of Patent: May 21, 2019

(54) METHODS, SYSTEMS, DEVICES AND PRODUCTS FOR ERROR CORRECTION IN COMPUTER PROGRAMS

(71) Applicant: AT&T Mobility II LLC, Atlanta, GA (US)

(72) Inventors: Jay O. Glasgow, Dallas, TX (US); Johannes Simon Jaskolski, Milford, CT (US)

(73) Assignee: AT&T MOBILITY II LLC, Atlanta, GA (US)

( * ) Notice: Subject to any disclaimer, the term of this patent is extended or adjusted under 35 U.S.C. 154(b) by 0 days.

(21) Appl. No.: 15/399,821

(22) Filed: Jan. 6, 2017

(65) Prior Publication Data

US 2017/0118226 A1 Apr. 27, 2017

Related U.S. Application Data

(63) Continuation of application No. 12/850,363, filed on Aug. 4, 2010, now Pat. No. 9,560,035.

(51) Int. Cl.
*H04L 29/06* (2006.01)
*H04W 12/06* (2009.01)

(52) U.S. Cl.
CPC ........ *H04L 63/0807* (2013.01); *H04L 63/083* (2013.01); *H04L 63/108* (2013.01); *H04W 12/06* (2013.01); *H04L 63/168* (2013.01)

(58) Field of Classification Search
CPC .................................................. H04L 63/0807
See application file for complete search history.

(56) References Cited

U.S. PATENT DOCUMENTS

| | | | |
|---|---|---|---|
| 5,963,915 A * | 10/1999 | Kirsch | G06Q 20/12 |
| | | | 705/26.8 |
| 6,374,359 B1 | 4/2002 | Shrader et al. | |
| 6,763,468 B2 * | 7/2004 | Gupta | G06F 21/33 |
| | | | 726/10 |
| 7,478,434 B1 | 1/2009 | Hinton et al. | |
| 7,503,065 B1 | 3/2009 | Packingham et al. | |
| 7,516,483 B2 * | 4/2009 | Brennan | G06F 21/34 |
| | | | 709/229 |
| 7,954,141 B2 | 5/2011 | De Lutiis et al. | |
| 7,966,497 B2 * | 6/2011 | Gantman | G06Q 20/3272 |
| | | | 380/255 |
| 7,992,198 B2 * | 8/2011 | Guarraci | H04L 63/08 |
| | | | 713/175 |

(Continued)

OTHER PUBLICATIONS

O'Gorman; Comparing passwords, tokens, and biometrics for user authentication; Published in: Proceedings of the IEEE; (vol. 91, Issue: 12, Dec. 2003); pp. 2021-2040; IEEE Xplore (Year: 2003).*

(Continued)

*Primary Examiner* — Bradley Holder

(74) *Attorney, Agent, or Firm* — Scott P. Zimmerman, PLLC

(57) ABSTRACT

A login session server establishes a communications session between an application executing on a device and a service provided by a web services gateway. A temporary login session socket is established and a token is sent to the device. The temporary login session socket may be used to verify a service provided by the web services gateway.

20 Claims, 11 Drawing Sheets

(56) References Cited

U.S. PATENT DOCUMENTS

| | | | | |
|---|---|---|---|---|
| 8,341,270 B2* | 12/2012 | Mazzaferri | ............ | G06F 3/1415 |
| | | | | 709/217 |
| 8,355,407 B2* | 1/2013 | Wookey | ................ | G06F 3/1415 |
| | | | | 370/389 |
| 8,511,547 B2* | 8/2013 | Rans | .................... | G06Q 20/341 |
| | | | | 235/380 |
| 8,705,720 B2* | 4/2014 | Kurapati | ................. | H04L 63/08 |
| | | | | 379/142.05 |
| 8,756,660 B2* | 6/2014 | Malakapalli | ........ | H04L 63/0838 |
| | | | | 713/168 |
| 8,875,264 B2* | 10/2014 | Tamai | .................... | G06F 21/36 |
| | | | | 713/168 |
| 2009/0328182 A1* | 12/2009 | Malakapalli | ........ | H04L 63/0838 |
| | | | | 726/11 |
| 2011/0271099 A1 | 11/2011 | Preiss et al. | | |

OTHER PUBLICATIONS

Sutcu et al.; A secure biometric authentication scheme based on robust hashing; Published in: Proceeding MM&Sec '05 Proceedings of the 7th workshop on Multimedia and security; 2005; pp. 111-116; ACM Digital Library (Year: 2005).*

O'Gorman, "Comparing passwords, tokens, and biometrics for user authentication", Proceeding of the IEEE, vol. 91, Issue 12, Dec. 2003), pp. 2012-2040, IEEE Xplore.

Sutcu et al., "A Secure biometric authentication scheme based on robust hashing" Proceeding MM & Sec '05 Proceedings of the $7^{th}$ workshop on Multimedia and security; 2005; pp. 111-116; ACM Digital Library.

* cited by examiner

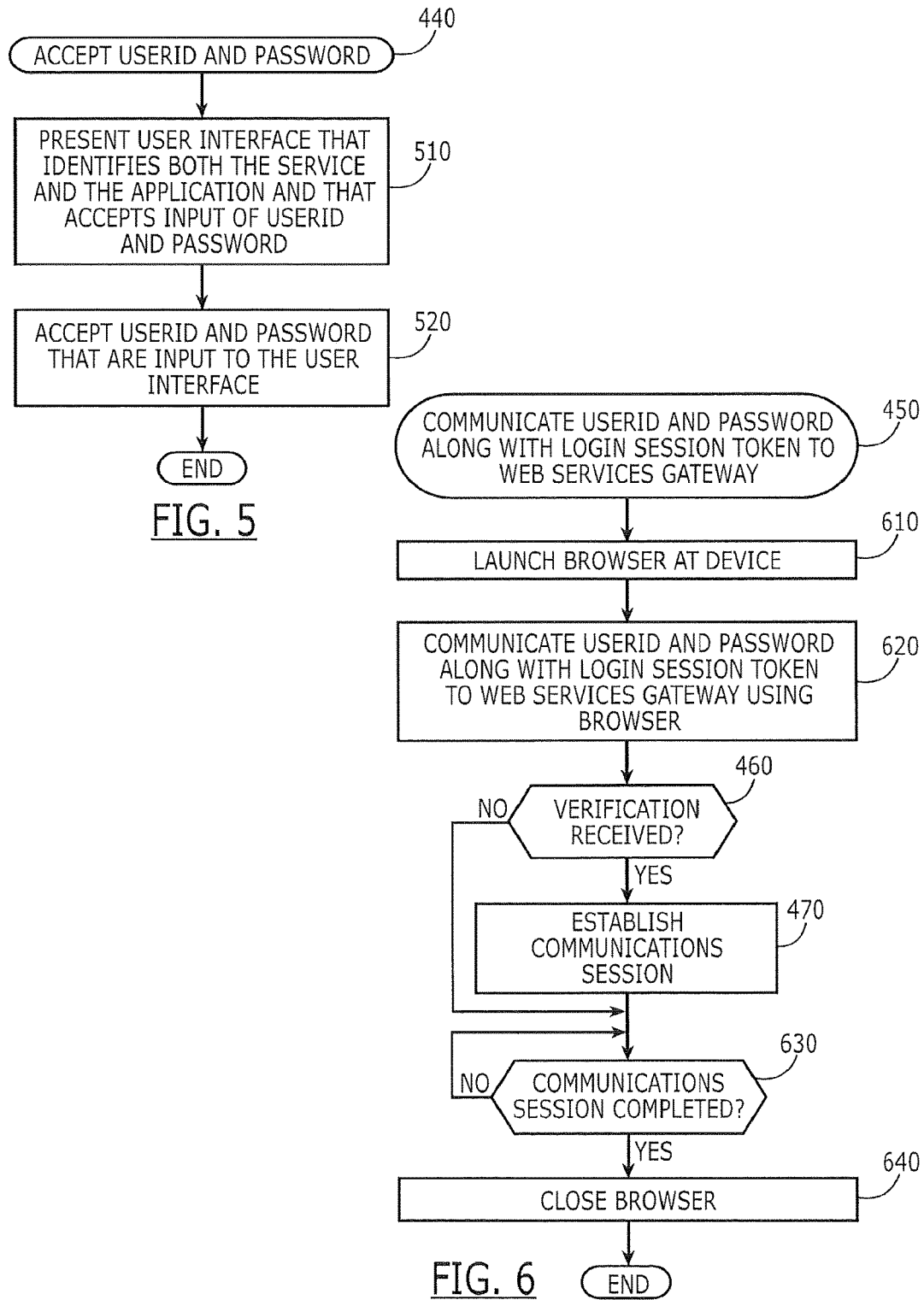

METHODS, SYSTEMS, DEVICES AND PRODUCTS FOR ERROR CORRECTION IN COMPUTER PROGRAMS

CROSS-REFERENCE TO RELATED APPLICATION

This application is a continuation of U.S. application Ser. No. 12/850,363 filed Aug. 4, 2010 and since issued as U.S. Pat. No. 9,560,035, and incorporated herein by reference in its entirety.

BACKGROUND

The World Wide Web is being increasingly used for personal, commercial and other communications. Typically, a user device, such as a desktop, notebook or netbook computer, a smartphone or an embedded device, accesses the World Wide Web using a browser on the device that communicates with a web server. The web server may be hosted by an enterprise, such as a retailer, financial institution, media enterprise, social networking enterprise, etc. The web server may run applications that are supported by the hosting enterprise.

In running a web server application by a browser on a device, it is often desirable to access services of a third party service provider. These services may include telephony-based services and/or Internet protocol-based services, such as Short Message Services (SMS), Multimedia Messaging Services (MMS), IP Multimedia Services (IMS), email text-to-speech conversion, voice recognition, chat, retrieval of contacts, retrieval of database records, etc. In these cases, a secure connection may be pre-established between the web server and a Web Services Gateway (WSG) of the service provider. These secure connections can allow the web server to register the device with the service provider, so that the device can then log on to the service provider using its browser, and use the third party services provided by the service provider as part of the application.

A new phenomenon has recently emerged in the application environment: applications that run natively on a device rather than running through a host web server. These applications are commonly referred to as "apps". For example, hundreds of thousands of applications have been written by large numbers of application developers to run natively on the iPhone® device. These applications may be compiled applications that run natively on the device, rather than running on a web server and interacting with the device using its browser. The proliferation of applications has made it possible for developers with limited resources to develop specialized applications that can run natively on a device without the need for the overhead of a web server.

Unfortunately, since these natively run applications need not use a web server, it has been difficult for service providers to be able to make their services available to these natively run applications. Thus, although these natively run applications could benefit from using service providers and the service providers could benefit from providing services to these natively run applications, it has been difficult for the service providers to support these natively run applications.

SUMMARY

Various embodiments described herein can provide methods for establishing a communications session between an application that runs natively on a device and a service that is secured by a web services gateway. In some embodiments, the device supports a temporary login session socket between the device and a login session server. A login session token is received at the device from the login session server. A userid and a password for the service is accepted from a user at the device. The userid and password along with the login session token are communicated from the device to the web services gateway. The communications session between the application that runs natively on the device and the service that is secured by the web services gateway is then established in response to verification by the web services gateway of the userid, the password and the login session token. In some embodiments, prior to communicating the userid and password along with the login session token from the device to the web services gateway, the userid and password along with the login session token are communicated from the login session server to the web services gateway, so that they can be verified when communicated from the device. Accordingly, applications that run natively on a device can use the services of the service provider even though an enterprise web server does not provide an application host that is preregistered with the service provider.

In some embodiments, the temporary login session socket is provided by a temporary bidirectional secure socket between the device and the login session server, and the login session token is received over the temporary bidirectional secure socket. Moreover, the temporary login session socket, such as the temporary bidirectional secure socket, may be closed in response to receiving the login session token at the device from the login session server.

In other embodiments, the userid and password for the service are accepted at the device by presenting at the device a user interface that identifies both the service and the application and that accepts input of the userid and password. The user interface accepts the userid and password that are input to the user interface. Since the user interface identifies both the service and the application, the user of the user device may be aware that the user is logging on to a third party service that will be used by the application that runs natively on the device.

In still other embodiments, the userid and password along with the login session token are communicated from the device to the web services gateway by launching a browser at the device and communicating the userid and the password along with the login session token from the device to the web services gateway using the browser. The browser is then closed in response to receipt of the userid and the password along with the login session token by the web services gateway. Direct bidirectional communications may then take place between the application program that runs natively on the device and the web services gateway.

In still other embodiments, the communications session between the application that runs natively on the device and the service that is secured by the web service gateway is established by establishing a bidirectional link between the device and the service in response to verification by the web services gateway of the userid, the password and the login session token. The application that runs natively on the device is then allowed to access the service that is secured by the web services gateway over the bidirectional link between the device and the service.

The userid, the password and the login session token may be communicated from the device to the web services gateway by combining the userid, the password and the login session token to produce an application-specific login for the device, which is communicated from the device to the web services gateway. Communications may be established between the application that runs natively on the device and the service that is secured by the web services gateway in response to verification by the web services gateway of the application-specific login.

In some embodiments, communicating the userid and password along with the login session token from the device to the web services gateway and/or from the login session server to the web services gateway may be direct. In other embodiments, these communications may take place indirectly via a security server that lies outside the firewall of the service provider and web services gateway. Thus, in some embodiments, the userid and password along with the login session token may be communicated from the device to the security server and then the userid and password along with the login session token may be communicated from the security server to the web services gateway. Prior to this communication taking place, the userid and password along with the login session token may also be communicated from the login session server to the web services gateway via the security server, as well.

It will be understood that various embodiments have been described above in connection with methods that are performed by the device. Complementary methods may also be performed by the login session server. Moreover, although various embodiments have been described above in connection with methods, analogous devices that include an application program that runs natively thereon, analogous login session servers and analogous computer program products for devices and servers may also be provided according to other embodiments.

Other methods, systems, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

FIG. 5 is a flowchart of operations that may be performed to accept a userid and password according to various embodiments described herein.

FIG. 6 is a flowchart of operations that may be performed to communicate a userid and password along with a login session token to a web services gateway according to various embodiments described herein.

DETAILED DESCRIPTION

Figure 1:
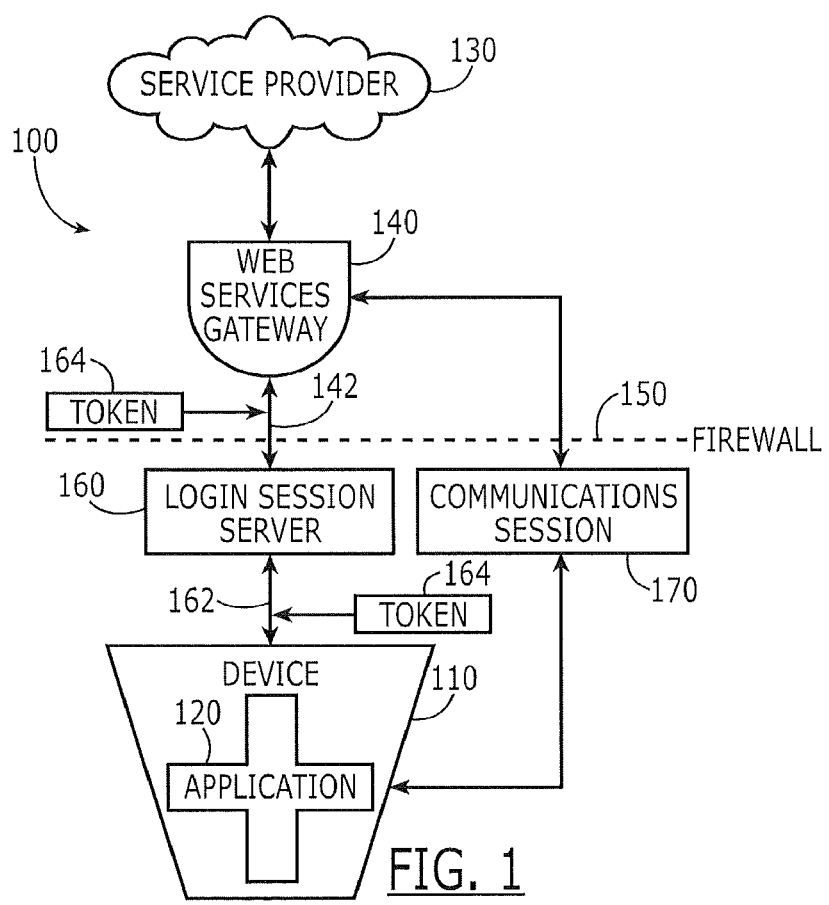
FIGS. 1 and 2 are block diagrams of systems, devices, methods and computer program products for establishing a communications session between an application that runs natively on a device and a service that is secured by a web services gateway, according to various embodiments described herein.

Various embodiments now will be described more fully hereinafter with reference to the accompanying drawings, in which illustrative embodiments are shown. However, many different forms may be provided and should not be construed as limited to the embodiments set forth herein. Rather, these embodiments are provided so that this disclosure will be thorough and complete, and will fully convey the scope of various embodiments to those skilled in the art.

It will be understood that when an element is referred to as being "coupled", "connected" or "responsive" (and variants thereof) to another element, it can be directly coupled, connected or responsive to the other element or intervening elements may also be present. In contrast, when an element is referred to as being "directly coupled", "directly connected" or "directly responsive" (and variants thereof) to another element, there are no intervening elements present. Like numbers refer to like elements throughout. As used herein the term "and/or" includes any and all combinations of one or more of the associated listed items and may be abbreviated by "/".

It will also be understood that, although the terms first, second, etc. may be used herein to describe various elements, these elements should not be limited by these terms. These terms are only used to distinguish one element from another element.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art in light of the present disclosure, and will not be interpreted in an idealized or overly formal sense unless expressly so defined herein.

The present invention is described in part below with reference to block diagrams and flowcharts of methods, systems and computer program products according to various embodiments. It will be understood that a block of the block diagrams or flowcharts, and combinations of blocks in the block diagrams or flowcharts, may be implemented at least in part by computer program instructions. These computer program instructions may be provided to one or more enterprise, application, personal, pervasive and/or embedded computer systems, such that the instructions, which execute via the computer system(s) create means, modules, devices and/or methods for implementing the functions/acts specified in the block diagram block or blocks. A computer program according to embodiments of the invention comprises a tangible, non-transitory computer usable storage medium having computer-readable program code embodied therein. Combinations of general purpose computer systems and/or special purpose hardware also may be used in other embodiments.

These computer program instructions may also be stored in memory of the computer system(s) that can direct the computer system(s) to function in a particular manner, such that the instructions stored in the memory produce an article of manufacture including computer-readable program code which implements the functions/acts specified in block or blocks. The computer program instructions may also be loaded into the computer system(s) to cause a series of operational steps to be performed by the computer system(s) to produce a computer implemented process such that the instructions which execute on the processor provide steps for implementing the functions/acts specified in the block or blocks. Accordingly, a given block or blocks of the block diagrams and/or flowcharts provides support for methods, computer program products and/or systems (structural and/or means-plus-function).

It should also be noted that in some alternate implementations, the functions/acts noted in the flowcharts may occur out of the order noted in the flowcharts. For example, two blocks shown in succession may in fact be executed substantially concurrently or the blocks may sometimes be executed in the reverse order, depending upon the functionality/acts involved. Finally, the functionality of one or more blocks may be separated and/or combined with that of other blocks.

FIG. 1 is a block diagram of systems, devices, methods and computer program products for establishing a communications session between an application that runs natively on a device and a service that is secured by a web services gateway, according to various embodiments described herein. More specifically, these systems, devices, methods and/or computer program products 100 allow a communications session 170 to be established between an application 120 that runs natively on a device 110 and a service that is provided by a service provider 130 and is secured by a web services gateway 140. The service provider 130 may be embodied by one or more enterprise, application, personal, pervasive or embedded computer systems that may be standalone or linked by a network including a wired and/or wireless, public and/or private, real and/or virtual network including the Internet. The service provider 130 may provide basic telephony and/or IP-based services that may be used by a wide variety of Internet-based applications. For example, the service provider 130 may provide SMS, MMS, email, text-to-speech, voice recognition, chat, retrieval of contacts, retrieval of database records and/or other services. The service provider 130 may be a telecommunications enterprise and/or a web services provider, such as an Internet search engine, that can provide basic services for a wide variety of applications.

The service provider 130 is accessed by a web services gateway 140 that is protected behind a firewall 150. The web services gateway 140 is a gateway that provides a single point of control, access and validation of web services requests and allows the web service provider 130 to control which services are available to different groups of web service users. Web services gateways are currently marketed by IBM® as the IBM Web Services Gateway, by Alcatel-Lucent as the OmniAccess® 8550 Web Services Gateway, and by others.

The device 110 may be a smartphone, such as an Apple® iPhone or a BlackBerry® device, but may include other smartphones, Internet appliances, set top boxes, home security systems, home management devices, vehicle electronics and/or other enterprise, application, personal, pervasive and/or embedded computing systems that are used by a user to access web services. These devices 110 may include a browser therein that can access an application at a web server. However, these devices 110 may also run an application 120 natively on the device 110. In fact, as noted above, hundreds of thousands of specialized applications have now been written for smartphone devices, to be downloaded to the devices in compiled form and run natively on these devices.

When a device accesses a web server using a browser to run an application on the web server, the web server may be responsible for obtaining from the service provider 130 the services that may be used to run the application on the device 110. However, when the application 120 runs natively on the device 110, the device 110 need not interact with a web server to obtain the necessary services from the service provider 130. Accordingly, it has been difficult for native applications 120 to use the services of the service provider 130, which may decrease the functionality or usability of a given native application 120, and may also decrease revenue opportunities for the service providers 130.

Various embodiments described herein provide a login session server 160 that can facilitate establishing of a communications session 170 between an application 120 that runs natively on the device 110 and a service of a service provider 130 that is secured by a web services gateway 140. More specifically, the login session server 160 establishes a temporary login session socket 162 with the device 110, and provides a login session token 164 to the device 110. The login session server 160 also communicates the userid and password of the user device along with the login session token 164 to the web services gateway 140 via connection 142. The login session server 160 may then close the temporary login session socket 162. The device 110 may then communicate with the web services gateway 140 using the userid, password and login session token 164. Thus, a communications session 170 may proceed between the service provider 130 and the application 120, even though the application 120 does not communicate with the service provider 130 via a web server for the application.

Figure 2:
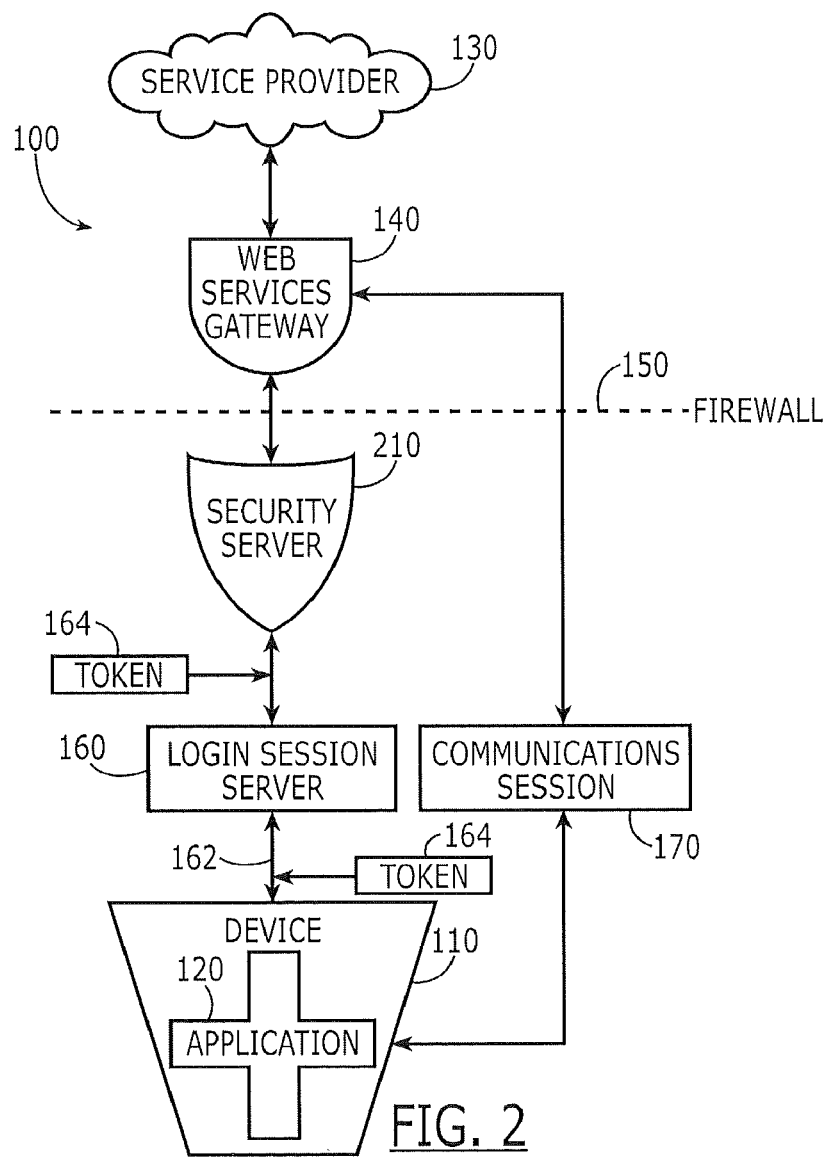

FIG. 1 assumed that the login session server 160 communicates directly with the web services gateway 140. However, this need not be the case. More specifically, as illustrated in FIG. 2, the login session server 160 may communicate with the web services gateway indirectly via a security server 210. A security server 210, also referred to as a "single sign-on" server can provide a clearinghouse for access control of multiple, independent software systems. Single sign-on servers are currently marketed by Microsoft®, Netegrity®, IBM Tivoli® and others. Accordingly, communication between the login session server 160 and the web services gateway 140 may be direct (FIG. 1) or indirect (FIG. 2).

Figure 3:
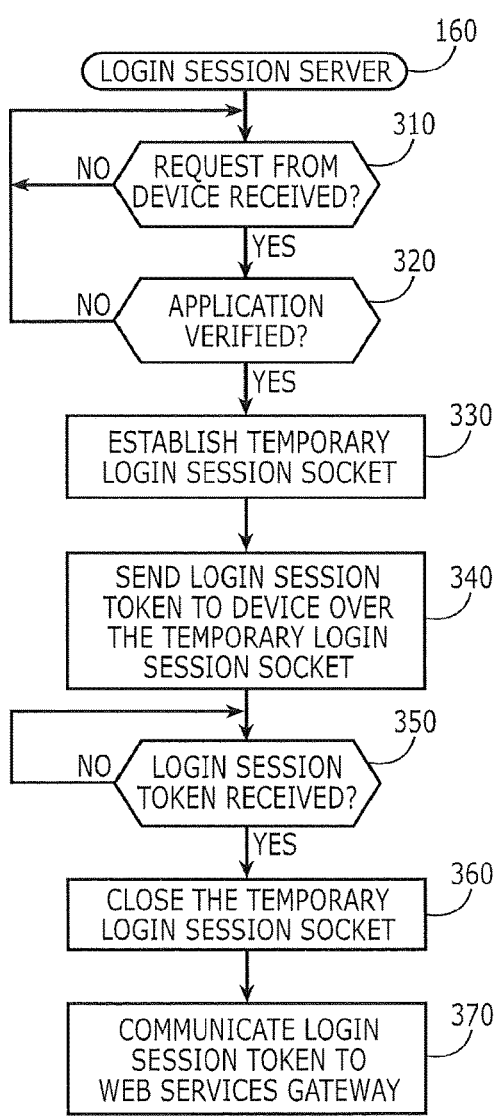
FIG. 3 is a flowchart of operations that may be performed by a login session server according to various embodiments described herein.

FIG. 3 is a flowchart of operations that may be performed by a login session server, such as the login session server 160 of FIG. 1 or 2, according to various embodiments described herein. Referring now to FIG. 3, in response to a request from a device 110 to access a service of the service provider 130 at Block 310, and in response to the application 120 being verified as having authorization to access the service provider at Block 320, a temporary login session socket is established by the login session server 160 with the device 110 at Block 320. Prior to establishing the temporary login session socket at Block 330 the login session server 160 can verify that the developer of the application 120 has purchased sufficient access (e.g., bandwidth, number of sessions, number of devices) to the service provider 130 to accommodate the application 120 on the device 110. The temporary login session socket may be indicated by communications link 162 of FIGS. 1 and 2, and may be a temporary bidirectional secure socket that is established in a Secure Socket Layer (SSL), in some embodiments.

Continuing with the description of FIG. 3, once the temporary login session socket has been established at Block 330, a login session token 164 is sent to the device 110 at Block 340. In response to the login session token 164 being received by the device at Block 350, the temporary login session socket is closed at Block 360. Accordingly, the temporary login session socket may remain open for a short period of time that need only be sufficient to allow communication of the token 164 to the device 110 and to confirm receipt by the device 110. The temporary login session socket therefore can be relatively secure. Finally, at Block 370, the login session token 164 is also communicated by the login session server 160 to the web services gateway 140, so that subsequent access by the application 120 during the communications session 170 can be verified using the login session token 164.

Figure 4:
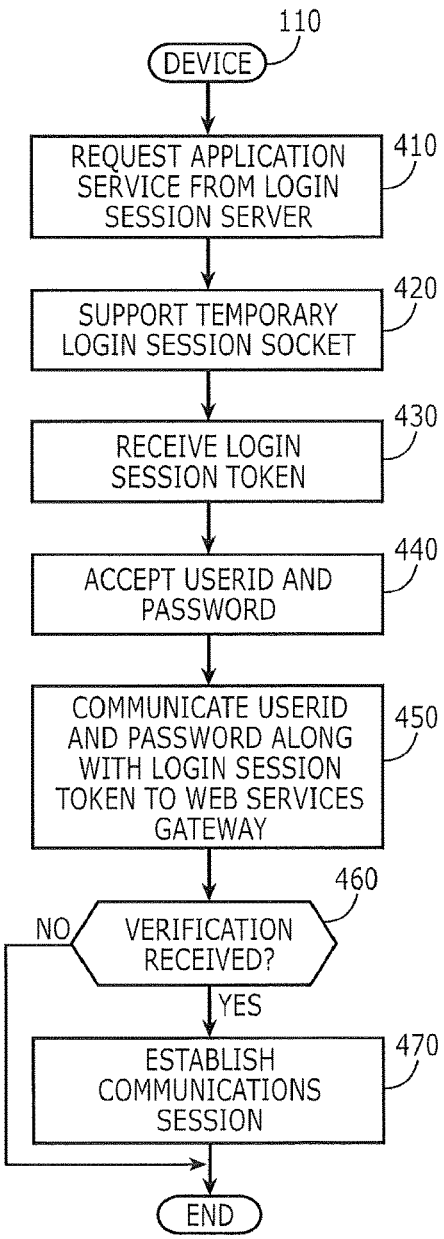
FIG. 4 is a flowchart of operations that may be performed by a device according to various embodiments described herein.

FIG. 4 is a flowchart of operations that may be performed by a device, such as a device 110, according to various embodiments described herein. These operations may be triggered by the application 120 that runs natively on the device 110 seeking to obtain application services from the service provider 130 in order to run the application 120.

Referring to FIG. 4, at Block 410, the device 110 requests the application service from the login session server 160, and at Block 420 the device supports the temporary login session socket 162, such as a temporary bidirectional secure socket, that is established by the login session server 160 in response to verification at Block 320 of FIG. 3. At Block 430 the login session token 164 is received at the device 110 from the login session server 160 over the temporary login socket 162. A userid and a password for the service is then accepted at Block 440. The userid and password, along with the login session token is then communicated by the device 110 to the web services gateway at Block 450. Then, the device logs on to the web services gateway 140 and, upon receipt of verification at Block 460, the communications session 170 is established at Block 470.

FIG. 5 is a flowchart of operations that may be performed to accept a userid and password according to various embodiments described herein, which may correspond to Block 440 of FIG. 4. Referring to FIG. 5, at Block 510 a user interface is presented at the device 110. The user interface identifies both the service and the application 120, and accepts input of a userid and password for the service. Thus, prior to entry of a userid and password, a user of the device 110 is informed of the identity of the service and the identity of the application 120 that is requesting the services. An identification of the service provider 130 may also be presented by the user interface, instead of or in addition to the identification of the service. The user can thereby confirm that the access to the particular service provider 130 by the particular application 110 is valid before entering the userid and password. An example of a user interface will be provided below. The userid and password are then accepted at Block 520.

FIG. 6 is a flowchart of operations that may be performed to communicate the userid and password along with the login session token 164 to the web services gateway 140, such as may be performed at Block 450 of FIG. 4. Referring to FIG. 6, at Block 610 a browser is launched at the device 110. At Block 620 the userid and password along with the login session token 164 are communicated to the web service gateway 140 using the browser. Upon verification (Block 460 of FIG. 4), a communications session is established (Block 470 of FIG. 4) until the communications session is completed at Block 630, at which time the browser is closed at Block 640. In some embodiments, the browser may be closed immediately upon verification at Block 460, and a separate communications session may be established at Block 470 directly between the device 110 and the web services gateway 140. In other embodiments, the browser remains open for the duration of the communications session and is used to communicate the userid and password along with the login session token to the web services gateway at Block 620, and to also support the communications session at Block 630.

Figure 7:
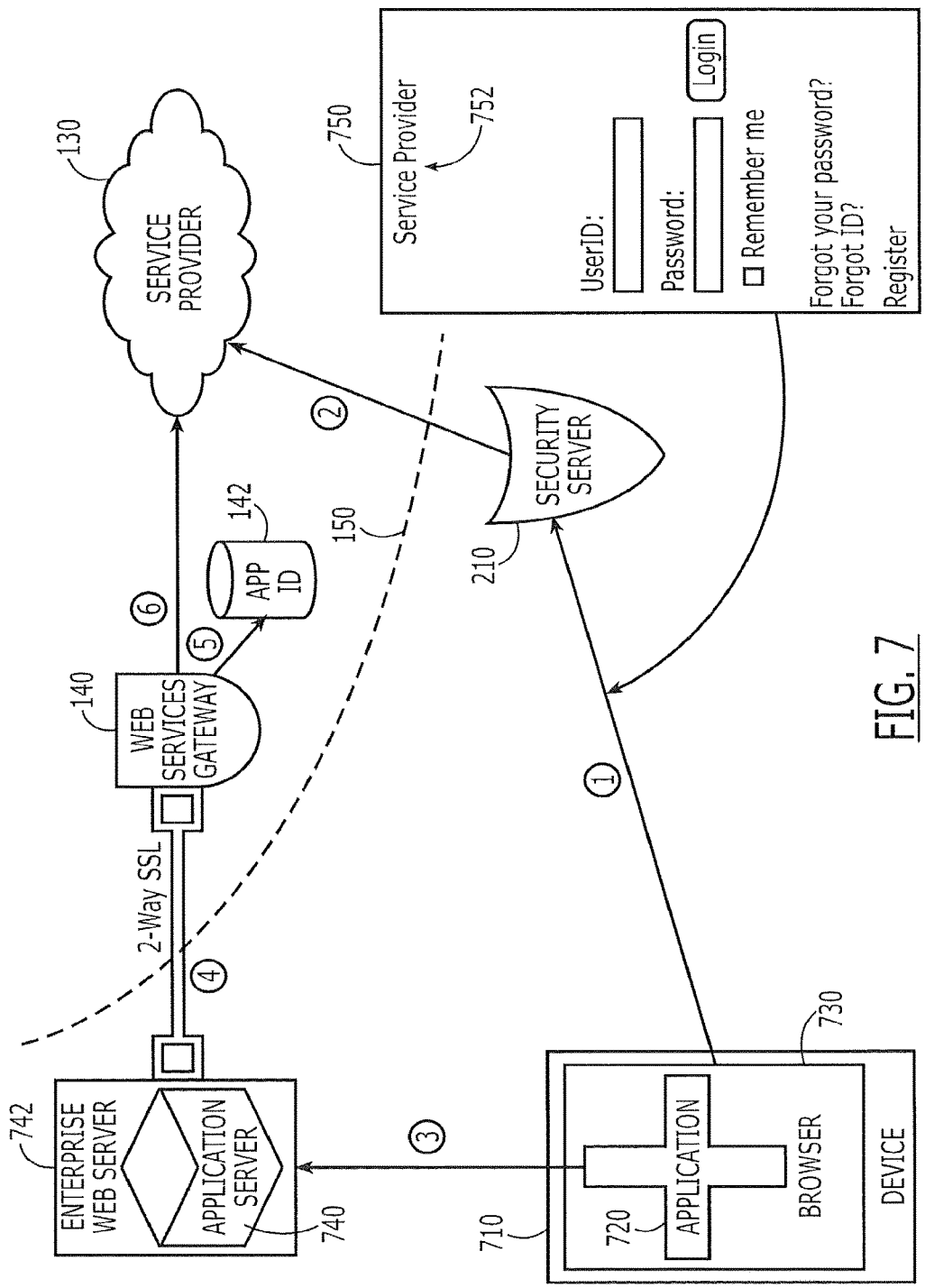
FIG. 7 is a block diagram of an application that accesses an application server in an enterprise web server and that also uses services of a service provider.

FIG. 7 is a block diagram of a conventional application that accesses an application server in an enterprise web server, and that also uses services of a service provider. The service provider 130, web services gateway 140 and security server 210 may be embodied as was described in FIGS. 1 and 2. The web services gateway 140 of FIG. 7 also illustrates an application ID database 142 that may be integral with the web services gateway or separate therefrom. The database 142 may be the repository for the application ID, userid, password and login session token data.

Referring to FIG. 7, the device 710 may be similar to the device 110 of FIGS. 1 and 2, except that the application 720 is not an application 120 that runs natively on the device 710. Rather, a client of the application 720 runs within a browser 730 and accesses an application server 740 that is part of an enterprise web server 742. In this regard, when the application 720 wishes to use the services of service provider 130, a request is made to the service provider 130 either directly or via a security server 210, as shown at $\hat{1}$ and $\hat{2}$. As part of this access, the service provider 130 presents to the browser 730 a user interface 750 including the service provider identification 752. The user of the device 710 can enter a userid and a password in the user interface 750.

Continuing with the description of FIG. 7, when the application 720 accesses the application server 740 at the enterprise web server 742 and wishes to access the service provider's services, the enterprise web server 742 can communicate with the web services gateway 140 using a two-way (bidirectional) secure socket link, as shown at $\hat{4}$, to provide the web services gateway 140 with the userid and the password of the user. The userid and password are stored at the application ID database 142, as shown at $\hat{5}$. As shown at $\hat{6}$, the service provider 130 can then provide the services to the application 720, upon confirmation of the userid and password.

Figure 8:
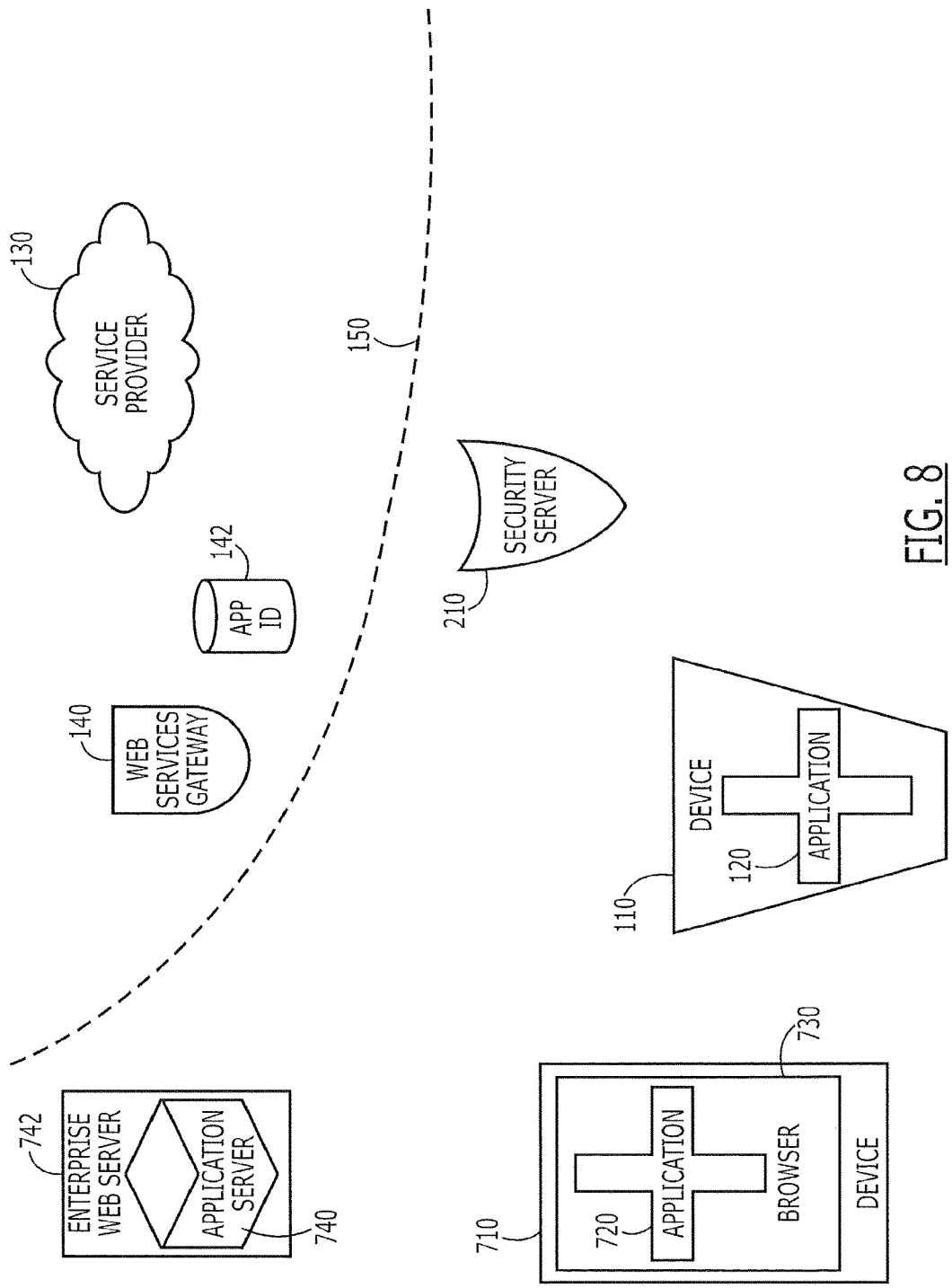
FIGS. 8-13 are blocks diagrams of systems, devices, methods and computer program products for establishing a communications session between an application that runs natively on a device and a service that is secured by a web services gateway, according to various embodiments described herein.

FIG. 8 illustrates a new environment in which many devices 110 include applications 120, such as compiled applications, that run natively on the devices. These applications 120 may not have access to an enterprise web server 742, as was the case for the application 720 that runs on a browser 730, even though the two applications may have similar or even identical functionality. Accordingly, there may be no available mechanism for the application 120 to access the services of the service provider 130. This may reduce the opportunity for the service provider 130 to provide a bigger market for its services, and may also reduce the ability of simple applications 120 to run natively on the device 110, because these applications 120 may not have access to basic services of the service provider 130.

Figure 9:
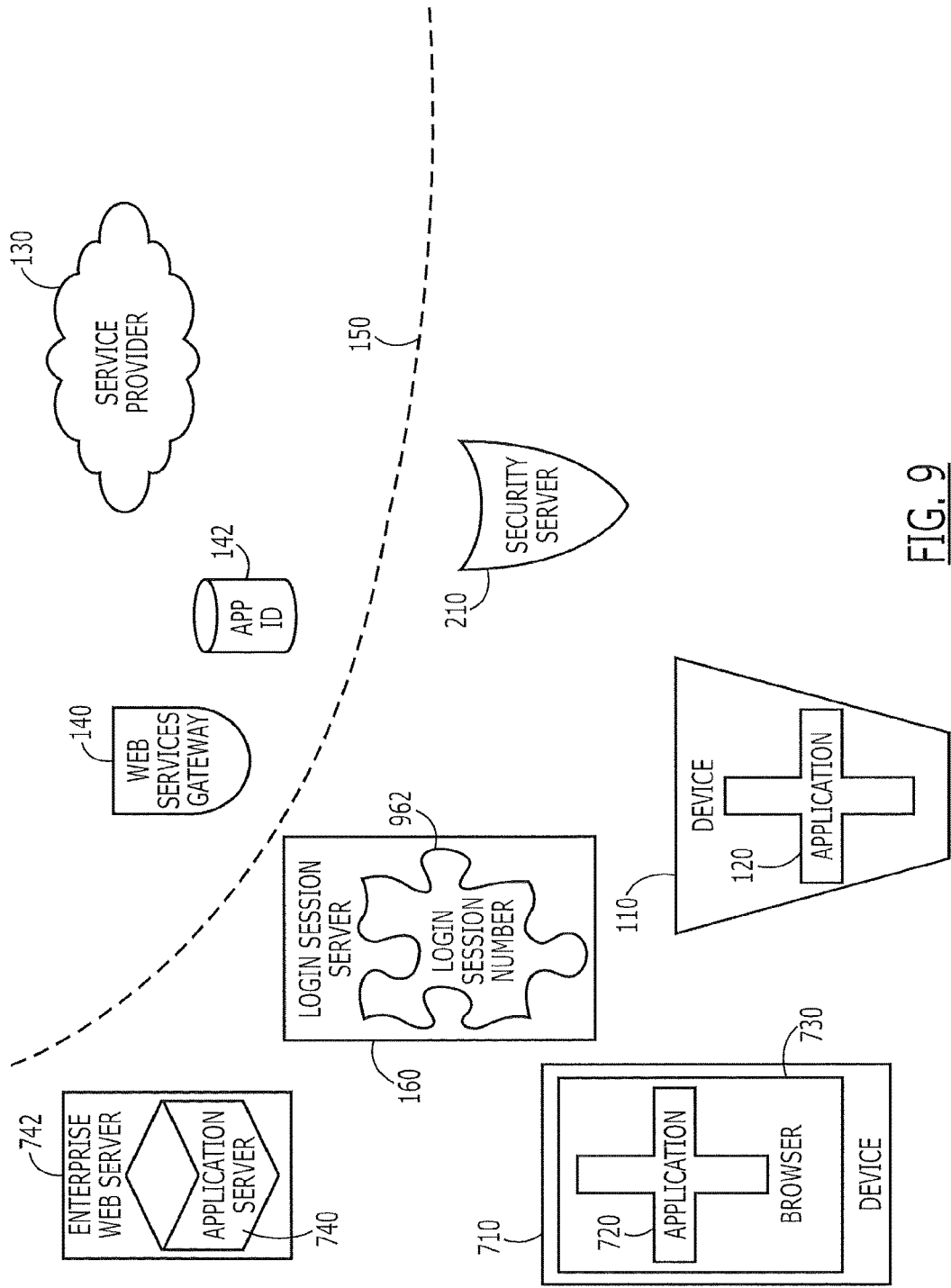

FIG. 9 illustrates the use of a login session server 160 according to various embodiments described herein. As will be described in more detail below, the login session server 160 can establish a temporary login session socket with the device 110 in response to a request by the device 110. The login session server 160 can send a login session token 164, also referred to herein as a login session number 962, to the device 110 over the temporary login session socket in response to verification that the application 120 is authorized to access the service provider 130. The temporary login session socket may then be closed in response to receipt of the login session token 962 by the device 110. The login session number 962 also may be communicated to the web services gateway 140 by the login session server 160, so that the web services gateway 140 can compare the password, userid and login session number 962 prior to providing services of the service provider 130. Accordingly, an application 120 that runs natively on the device 110 can purchase a given amount of service from the service provider 130 for its application 120, and the service provider 130 can then allocate these services as requested by the various devices 110, using the login session server 160. A mechanism is thereby provided to allow hundreds of thousands or more of native device applications 120 to use the services of the service provider 130, even though the application 120 does not execute on a browser through an application server 740 at an enterprise web server 742.

Figure 10:
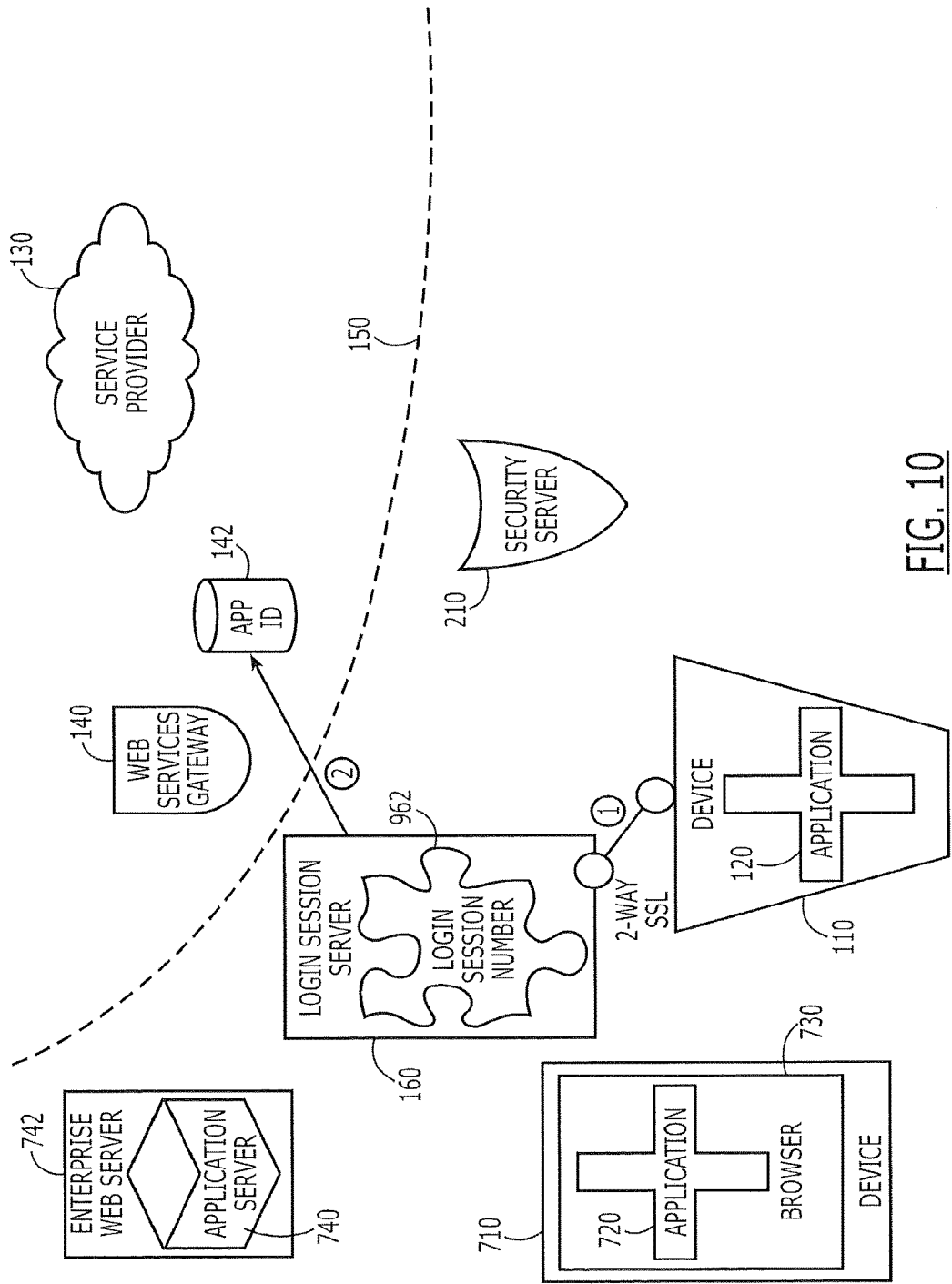

The use of a login server 160 and a login session number 960, according to some embodiments, will be further described in connection with FIGS. 10-13. Referring to FIG. 10, the device 110 and the login session server 160 create a temporary login session socket ("2-WAY SSL") in response to a request by the device 110 to use a service of the service provider 130, as shown at 1̂. A temporary login session socket may be embodied as a two-way secure socket link (SSL), which may be supported by the login session server and by the application 120 running in the device 110. The login session server 160 may also provide the application ID of the application 120 to the application ID database 142 as illustrated at 2̂. This communication may be direct or via the web services gateway 140.

Figure 11:
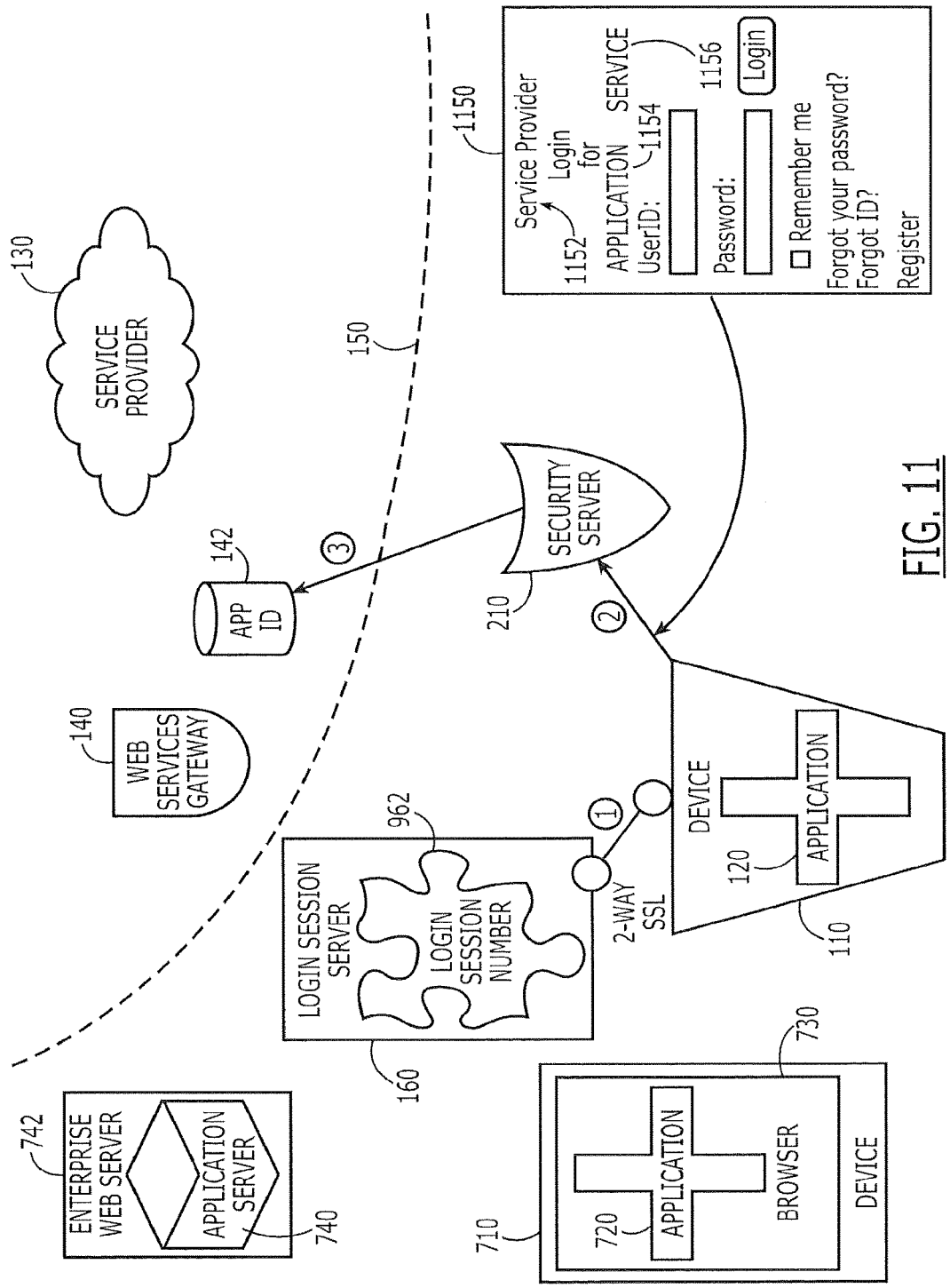

Referring now to FIG. 11, the login session token 162 or login session number 962 is provided to the application 120 on device 110 over the temporary login session socket, as shown at 1̂. The device then logs in to the service provider 130, either directly or through a security server 210. In this regard, the service provider provides a user interface 1150 that identifies the service provider, as shown at 1152, and that also identifies the application 120, as shown at 1154, and the service being requested, as shown at 1156. Thus, the user of the application 120 on the device 110 can enter a userid and a password, but can be cognizant of the fact that this userid and password is being provided to access the service provider, as shown at 1152, for the application 120, as shown at 1154, to access a given service, as shown at 1156. If any of these identifications are not valid, the user may refrain from providing the userid or password. The userid and password is then provided from the device 110 to the application ID database 142, either directly or via a security server 210 and/or web services gateway 140, as shown by 2̂ and 3̂.

Accordingly, the login session server 160 may only issue a login session number 962 to the device 110 upon verification that the application 120 has contracted with the service provider 130 to provide the service, and that the amount of service does not exceed preexisting agreed-upon limits. If this is the case, a temporary login session number 962 is issued by the login session server 160 and provided to the device 110. When the device 110 logs on at the user interface 1150, the device provides the userid, password and the login session number 962 to the application ID database 142.

In some embodiments, the token 162 or number 962, along with the userid and password, may be conveyed to the web services gateway 140 and/or its application ID database 142 by the device 110 opening up a browser and accessing the application ID database via the browser. Accordingly, in FIG. 11, link 2̂ may be established through a browser. The user interface 1150 that obtains the userid and password may also be launched through a browser. By using a browser to obtain the userid and password, and to encapsulate the login session token or number, enhanced security may be provided.

Figure 12:
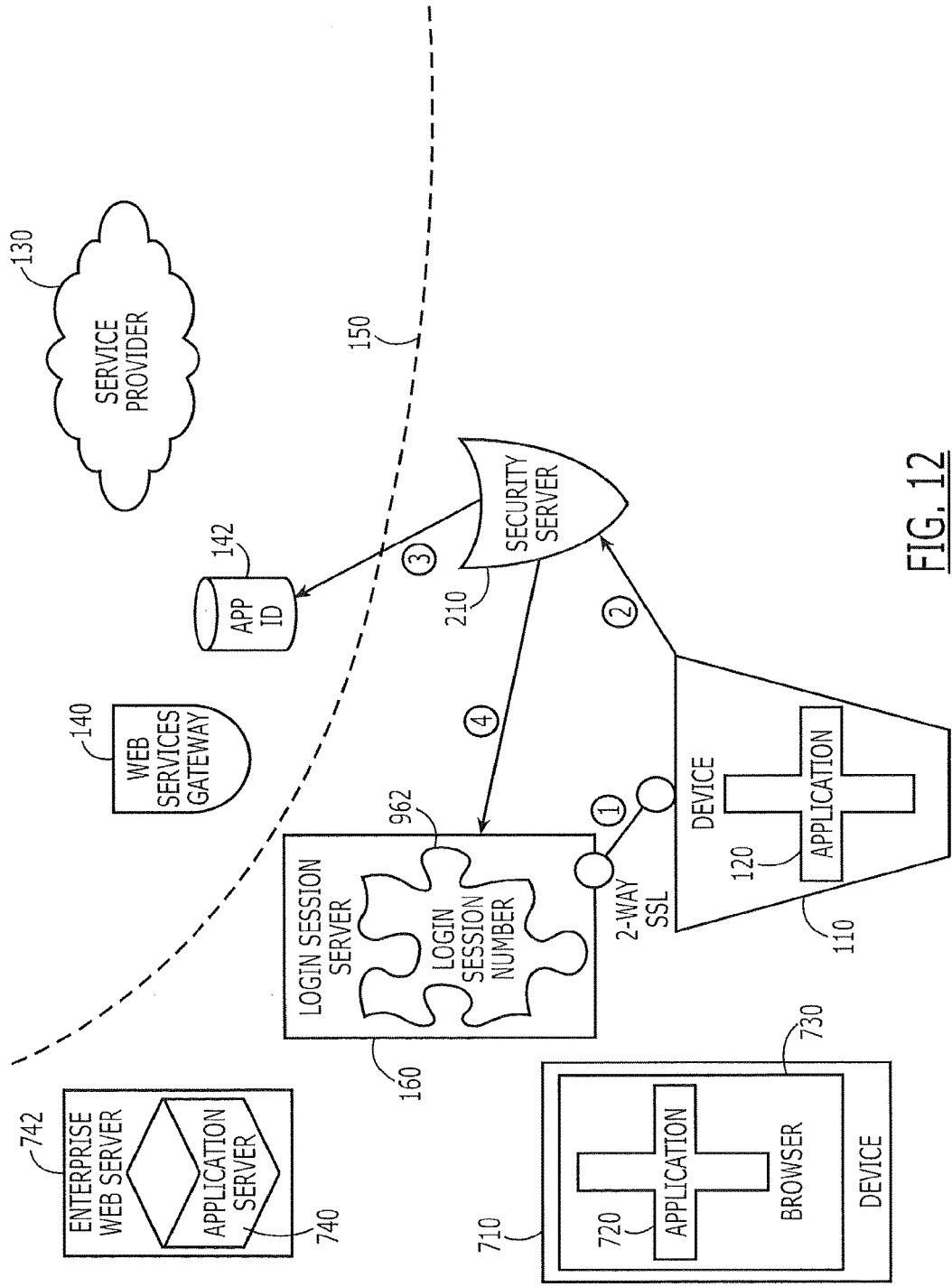

Referring now to FIG. 12, the security server 210 and/or the web services gateway 140 can then verify the login session token/number 162/962 with the login session server 160, as shown at 4̂. Upon verification, the login session server 160 informs the device that it can proceed to access the services, as shown at 5̂, and the temporary login session socket 1̂ is then closed down.

Figure 13:
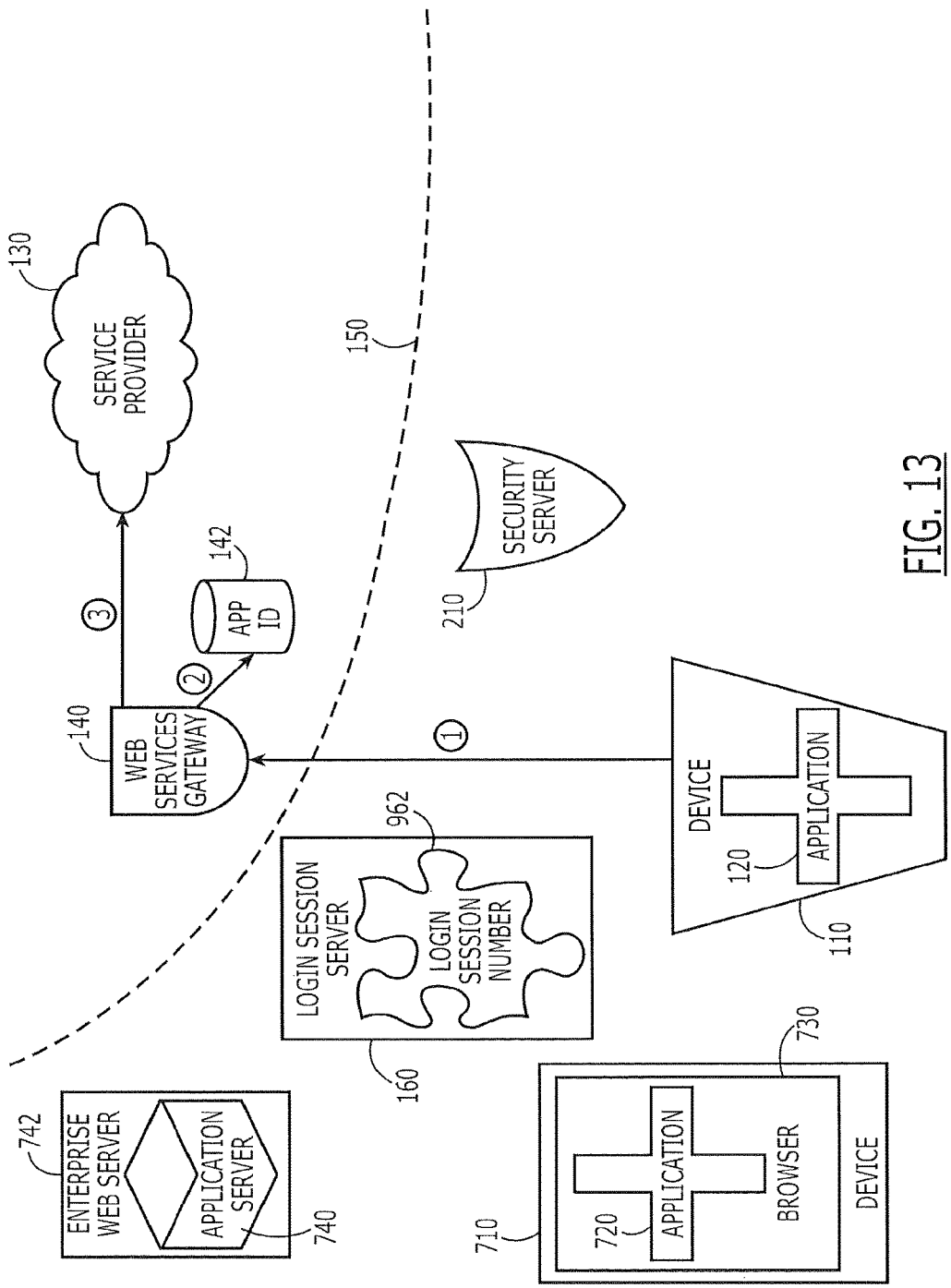

Finally, referring to FIG. 13, now that the application 120 has been provided the login session token/number 162/962 and the application userid and token/number have been registered at the web services gateway 140, the device can then communicate directly with the web services gateway, as shown in FIG. 13 at 1̂. The ID can be verified, as shown at 2̂, and, upon verification, the services can be provided, as shown at 3̂.

Accordingly, various embodiments described herein can allow a communications session to be established between an application 120 that runs natively on a device 110 and a service provider 130 that is secured by a web services gateway 130, even though the application 120 that runs natively does not run through an application server 140 on an enterprise web server 742.

It will be understood that various embodiments herein have described a login session server 160 for a given service provider 130. However, a login session server 160 may also serve a plurality of different service providers, and act as a clearinghouse to allow multiple natively run applications 120 on multiple devices 110 to access multiple services of multiple service providers without the need for the application to be associated with an application server 140 on an enterprise web server 742.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed embodiments of the invention and, although specific terms are employed, they are used in a generic and descriptive sense only and not for purposes of limitation, the scope of the invention being set forth in the following claims.

The invention claimed is:

1. A communications method performed by a login session server, comprising:

receiving, by the login session server, a login request sent from a web browser associated with a device requesting a service provided by a web services gateway;

establishing, by the login session server, a temporary bidirectional secure socket with the web browser via a secure socket layer, the temporary bidirectional secure socket established in response to the login request sent from the web browser associated with the device;

sending, by the login session server, a token to the web browser via the temporary bidirectional secure socket established via the secure socket layer, the token indicating that an application executed by the device is verified to access the service provided by the web services gateway;

closing, by the login session server in response to the sending of the token, the temporary bidirectional secure socket established with the web browser; and sending, by the login session server, the token to the web services gateway in response to the closing of the temporary bidirectional secure socket established via the secure socket layer, the token indicating the application executed by the device is verified to access the service provided by the web services gateway.

2. The communications method of claim 1, further comprising storing an electronic association between the service and the web services gateway.

3. The communications method of claim 1, further comprising receiving a user identification associated with the service provided by the web services gateway.

4. The communications method of claim 3, further comprising verifying the user identification associated with the service provided by the web services gateway.

5. The communications method of claim 1, further comprising receiving a password associated with the service provided by the web services gateway.

6. The communications method of claim 5, further comprising verifying the password associated with the service provided by the web services gateway.

7. The communications method of claim 1, further comprising sending a password to the web services gateway that accompanies the token.

8. A system, comprising:

a hardware processor; and a memory device, the memory device storing instructions, the instructions when executed causing the hardware processor to perform operations, the operations comprising:

receiving a login request sent from a web browser associated with a device requesting a web service provided by a web services gateway;

establishing a temporary bidirectional secure socket with the web browser via a secure socket layer, the temporary bidirectional secure socket established in response to the login request;

sending a token to the web browser via the temporary bidirectional secure socket established via the secure socket layer, the token indicating that an application executed by the device is verified to access the web service provided by the web services gateway;

closing, after the token is sent, the temporary bidirectional secure socket established via the secure socket layer; and sending, after the closing of the temporary bidirectional secure socket, the token to the web services gateway, the token indicating the application executed by the device is verified to access the web service provided by the web services gateway.

9. The system of claim 8, wherein the operations further comprise storing an electronic association between the web service and the web services gateway.

10. The system of claim 8, wherein the operations further comprise receiving a user identification associated with the web service.

11. The system of claim 10, wherein the operations further comprise verifying the user identification associated with the web service.

12. The system of claim 8, wherein the operations further comprise receiving a password associated with the web service.

13. The system of claim 12, wherein the operations further comprise verifying the password associated with the web service.

14. The system of claim 8, wherein the operations further comprise sending a password to the web services gateway that accompanies the token.

15. A non-transitory memory device storing instructions that when executed cause a hardware processor to perform operations, the operations comprising:

receiving a login request sent from a web server associated with a device requesting a web service provided by a web services gateway;

establishing a temporary bidirectional secure socket with the web browser via a secure socket layer, the temporary bidirectional secure socket established in response to the login request;

sending a token to the web browser via the temporary bidirectional secure socket established via the secure socket layer, the token indicating that an application executed by the device is verified to access the web service provided by the web services gateway;

closing, after the token is sent, the temporary bidirectional secure socket established via the secure socket layer; and sending, after the closing of the temporary bidirectional secure socket, the token to the web services gateway, the token indicating the application executed by the device is verified to access the web service provided by the web services gateway.

16. The non-transitory memory device of claim 15, wherein the operations further comprise storing an electronic association between the web service and the web services gateway.

17. The non-transitory memory device of claim 15, wherein the operations further comprise receiving a user identification associated with the web service.

18. The non-transitory memory device of claim 17, wherein the operations further comprise verifying the user identification associated with the web service.

19. The non-transitory memory device of claim 15, wherein the operations further comprise receiving a password associated with the web service.

20. The non-transitory memory device of claim 19, wherein the operations further comprise verifying the password associated with the web service.

* * * * *